Jan. 7, 1964

R. M. SMITH 3,117,264

WHEEL SLIP CONTROL BY GRADUAL REDUCTION
OF GENERATOR EXCITATION

Filed March 6, 1961

INVENTOR.
RUSSELL M. SMITH

BY Robert H Montgomery

ATTORNEY

United States Patent Office 3,117,264
Patented Jan. 7, 1964

3,117,264
WHEEL SLIP CONTROL BY GRADUAL REDUCTION OF GENERATOR EXCITATION
Russell M. Smith, Ripley, N.Y., assignor to General Electric Company, a corporation of New York
Filed Mar. 6, 1961, Ser. No. 93,715
4 Claims. (Cl. 318—52)

This invention relates to apparatus for controlling the excitation of a traction generator supplying electrical power to the traction motors of a locomotive, and more particularly relates to control of such excitation upon detection of loss of adhesion between the wheels of a locomotive and the rails upon which the wheels are traveling.

Loss of adhesion between the wheels of a locomotive and the rails upon which they are running is a serious problem presented to railroads which may result in damage to equipment and train delay. Such loss of adhesion which may be caused by wheel slippage during acceleration or motoring, or wheel sliding during dynamic braking, is due to excessive propulsive or braking torque on the powered wheels with respect to the adhesion between powered wheels and rail. It is common practice to reduce the propulsive or braking torque applied to traction motors driving the axles on a locomotive upon detection of loss of adhesion between driven wheel and rail in order to correct a wheel slipping or sliding condition.

This invention is concerned with and has as a primary object the provision of new and improved excitation control means for reducing at a predetermined timed rate the excitation of a traction generator which supplies electrical energy to traction motors of a locomotive upon detection of loss of adhesion between driven wheel and rail.

Figure 1:
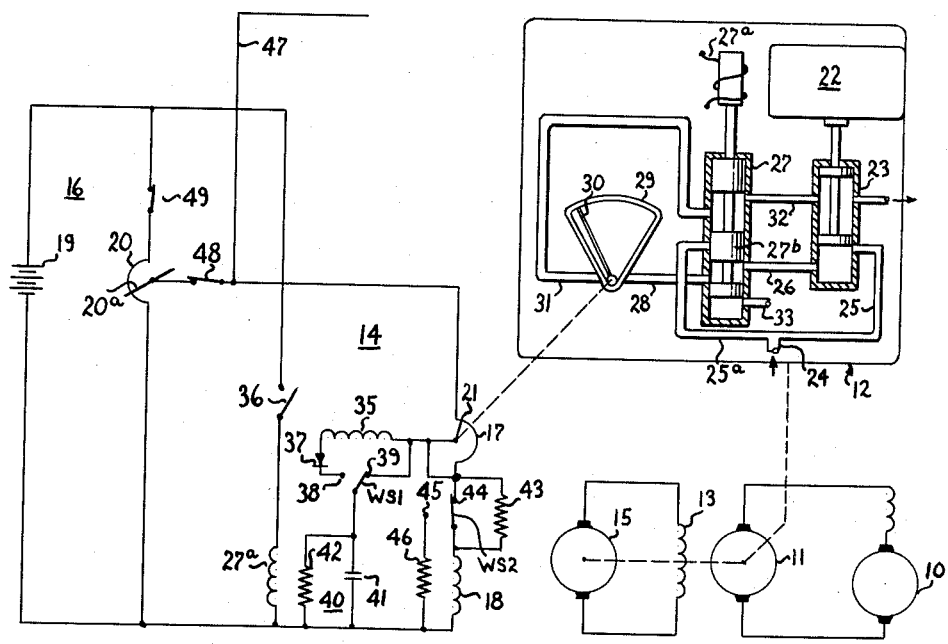
Figure 2:
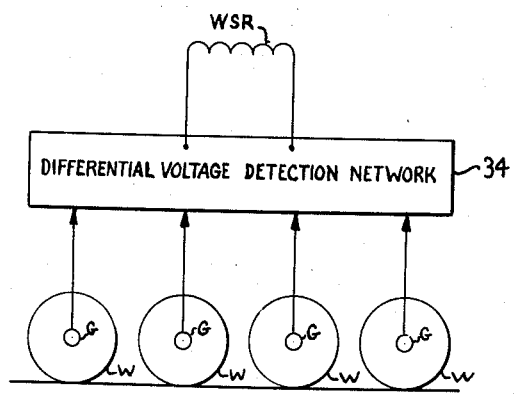

The features of the invention which are believed to be novel are set forth with particularity in the appended claims. The invention itself, however, both as to its organization and method of operation, together with further objects and advantages thereof can best be understood by reference to the following description when taken in connection with the following drawings wherein:

FIGURE 1 illustrates a locomotive propulsive system embodying this invention; and FIGURE 2, which is included for illustrative purposes, represents partially in block form a wheel adhesion loss detection system.

Reference is now made to FIG. 1 wherein I illustrate one traction motor 10 of an electrically propelled locomotive unit, not shown, which is supplied electrical energy by a traction generator 11 driven by a prime mover 12, such as a diesel engine. The generator 11 has a separately excited field 13, the degree of excitation of which determines the magnitude of the electrical energy supplied the traction motors. Excitation of the traction generator field 13 is controlled through an excitation control network 14 which includes an exciter generator 15 connected across traction generator field 13. The excitation control system further comprises a voltage source 16, illustrated as battery 19 and potentiometer 20 with variable tap 20a; however, it is to be understood that these circuit elements are merely representative of any voltage supply under control of the engineman wherein the voltage setting determines the power demand placed on the prime mover 12. It may thus be seen that energization of the exciter field is determined by the voltage at tap 20a of potentiometer 20 plus the series resistance of rheostat 17 determined by position of arm 21, which is under control of the governor 22 of engine 12. The governor 22 through a pilot valve 23 controls fuel supplied to the prime mover in a manner well known to those skilled in the art to cause operation of the locomotive prime mover at any of a plurality of constant values of speed and load. The governor 22 has conventional speed and load-setting means, not shown, by virtue of which constant values of output from the prime mover may be obtained. The pilot valve 23 is shown in its maximum speed setting position and hydraulic pressure from a source, not shown, introduced in a supply pipe 24 passes through line 25, through the pilot valve 23, through line 26, a governor overriding solenoid valve 27, line 28 into the housing of a vane motor 29 to move vane 30 to the position shown. Vane 30 is driveably connected to arm 21 of rheostat 17, and the position of vane 30 corresponds to the illustrative position of arm 21 of rheostat 17. The pressure in vane motor housing 29 is relieved through line 31, solenoid valve 27, line 32, pilot valve 23 and return to the hydraulic pressure source. The solenoid valve is so arranged that should the coil 27a thereof be actuated, the valve will move downwardly and valve portion 27b will block communication of lines 26 and 28. Hydraulic pressure is now introduced into vane motor 29 through line 25a, solenoid valve 27 and line 31, and therefore vane 30 of vane motor 29 will commence to move in a clockwise direction and drive arm 21 of rheostat 17 in such a direction as to increase the resistance of rheostat 17 in series with exciter field 18 and therefore reduce the current reduce the current through field 18. As vane 30 moves in a clockwise direction, the hydraulic fluid will be exhausted through lines 28 and line 33 and returned to the fluid pressure source. It will therefore be seen that the solenoid valve 27 may override the governor in controlling the exciter field load resistance.

In FIG. 2 I represents a wheel slip detection network wherein wheels W having traction motors, not shown, mounted thereon and drivingly connected to their axles, not shown, on rail R. Driveably mounted on the axles are generators G which furnish a voltage signal proportional to the driven speed of the axle to a voltage differential detection network 34. When there is any differential in the voltage signals applied to the voltage detection network 34 from axle-mounted generators G, voltage differential network 34 will actuate a wheel slip relay WSR. In practicing my invention, I prefer to use the adhesion loss detection network disclosed in the copending application of William B. Zelina, Serial No. 20,755, filed April 7, 1960, and assigned to the same assignee as the present application, to energize the wheel slip relay WSR. However, it is to be understood that other wheel slip or wheel slide detection networks which operate on the principle of detecting an unbalance in traction motor voltages or currents to detect motor speed differentials may be utilized.

In accordance with my invention, I provide means for reducing the excitation of the traction generator, and hence the propulsive torque of the traction motors and wheels driven thereby at a predetermined timed rate upon detection of loss of adhesion between wheel and rail. The timed reduction in excitation will continue until no loss of adhesion between wheel and rail is detected. I provide a relay 35 having a controlled contact 36 in series with the coil 27a of the overriding solenoid across the voltage source 16. The relay coil 35 is polarized, which is illustrated by means of a diode element 37 in series therewith. One terminal of the relay coil 35 is further connected to the arm 21 of rheostat 17, and the coil 35 and diode element 37 are connected across terminals 38 and 39 which may be selectively contacted by a contactor WS1 of wheel slip relay WSR. Contactor WS1 is further connected to a timing circuit 40 which comprises a capacitance 41 and a resistance 42.

It will be seen that the capacitor 41 will normally charge to the voltage at arm 21 of rheostat 17 when contactor WS1 contacts terminal 39, which by virtue of the connection of arm 21 to the low voltage side of rheostat 17, is the voltage across field 18. Assume now that there is loss of adhesion due to a slipping condition of one of the wheels, and differential voltage detection network 34 detects difference in axle speeds and energizes relay WSR. Contactor WS1 will be switched to terminal 38 and relay 35 will be placed in series between rheostat arm 21 and capacitor 41. Capacitor 41 will now discharge through resistance 42 at a timed rate determined by the values of capacitance 41 and resistance 42. When the voltage across capacitor 41 decreases due to discharge of capacitance 41 through resistance 42, there will be a flow of current from arm 21 through relay coil 35 and diode 37 inasmuch as the potential at arm 21 will exceed the voltage across the capacitance 41. When current flows through relay coil 35, contact 36 will close to place a voltage across solenoid valve coil 27a which will produce a current therethrough and cause the solenoid valve to move downwardly from the position illustrated. Valve portion 27b will block communication between lines 26 and 28 and lines 25a and 31 will communicate through solenoid valve 27 to provide a clockwise force on vane 30. The right hand (as illustrated) portion of vane motor 29 will be vented through line 28, valve 27 and line 33. As vane 30 is driven in a clockwise direction, it also drives arm 21 of rheostat 17 in a clockwise direction (as illustrated) to insert resistance in series with exciter field 18. The movement of arm 21 along rheostat 17 decreases the voltage at arm 21 and when the voltage difference between capacitor 41 and arm 21 no longer exceeds the drop out value of relay 35, contact 36 will be opened to de-energize solenoid valve 27 and fluid pressure will again be admitted to the vane motor 29, which will tend to drive vane 30 in a counterclockwise direction. However, the charge will continue to leak off of capacitor 41 through resistance 42 and the above-described action will repeat to increase the resistance in series with exciter field 18, which decreases the excitation of exciter 15, hence the output of exciter 15 and the excitation of traction generator 11, which in turn decreases the electrical power supplied to traction motor 10, and hence the propulsive torque applied to wheels W. This timed reduction in excitation of the traction generator, and hence propulsive torque applied to the wheels W, will continue until wheel slip relay WSR drops out when a loss of adhesion between wheels and rail is no longer detected.

At this time line 25 is again placed in communication with line 28 and vane 30 of vane motor 29 is moved in a counterclockwise direction by fluid pressure, and movement of vane 30 moves arm 21 of rheostat 17 in a counterclockwise direction to decrease the resistance in series with exciter field 18, and therefore increase the excitation of exciter 15 and hence traction generator 11.

I may also provide a wheel slip relay contactor WS2 in series with exciter field 18, which is shunted by a resistance 43. When this feature is utilized and wheel slip relay WSR is energized, contactor WS2 will move from terminal 44 to terminal 45 to place resistance 43 in series with exciter field 18 to decrease the excitation thereof and at the same time place resistance 46 across exciter field 18. The resistances 43 and 46 are so selected that the combination of resistance 43 in series with the parallel resistance of the field 18 and resistance 46 presents substantially the same resistance beyond the rheostat as is presented by the field 18 itself.

By reducing the excitation of the traction generator at a predetermined timed rate to reduce the propulsive torque applied to a slipping or sliding wheel, there is no sudden decrease in propulsive torque applied to the wheels and the excitation only need be reduced to a value where the wheels will again have rolling contact with the rails.

The engineman's control signal, illustrated as derived from tap 20a of potentiometer 20, may be trainlined over line 47 to other units forming a multiple unit locomotive, switches 48 and 49 in the trailing units may be opened so that all units receive the engineman's control signal over trainline 47. It will be noted in the disclosed excitation system embodying the invention that traction generator excitation is reduced only on the locomotive unit on which a wheel slip or slide is detected, and therefore other units of a locomotive not experiencing wheel slippage will continue to deliver the tractive effort called for by the setting of tap 20a on potentiometer 20.

The invention is further applicable to excitation systems wherein the traction generator field 13 is directly excited from a voltage source 16 and no exciter generator is utilized.

While I have illustrated and described a preferred embodiment of the invention, changes in this disclosed embodiment may occur to those skilled in the art which do not depart from the spirit and scope of the invention. Accordingly, it is intended to cover all changes and modifications of the example of the invention herein chosen for purposes of disclosure which does not constitute departures from the spirit and scope of the invention.

What I claim as new and desire to secure by Letters Patent of the United States is:

1. In a locomotive unit, a governor-controlled prime mover, traction motors adapted to drive the locomotive wheels on rail, a generator driven by the prime mover adapted to control electrical power supplied to the traction motors, a generator field for controlling excitation of the generator, means for deriving a voltage of magnitude determining the power demand on the prime mover, means for detecting loss of adhesion between the locomotive wheels and rail, a series circuit comprising said voltage-deriving means, a governor-controlled variable resistance and said generator field; a voltage source normally of magnitude equal to the voltage across said field and arranged to decrease in magnitude at a predetermined timed rate upon detection of loss of adhesion between wheel and rail, means effective for sensing differences in voltages of said source and voltage across said field upon detection of loss of adhesion between wheels and rail, means responsive to a sensed differential in the voltage across said field and the voltage of said source for overriding governor control of said rheostat to increase the magnitude of the resistance in series with said field and therefore decrease the current through said field circuit to decrease the excitation of said generator at a rate determined by the rate of decrease in magnitude of the voltage of said voltage source.

2. In a locomotive unit, a governor-controlled prime mover, traction motors adapted to drive the locomotive wheels on rail, a generator driven by the prime mover adapted to control electrical power supplied to the traction motors, a generator field for controlling excitation of the generator, an exciter generator adapted to excite said generator field and having an exciter field, means for deriving a voltage of magnitude determining the power demand on the prime mover, means for detecting loss of adhesion between the locomotive wheels and rail, a series circuit comprising said voltage-deriving means, a governor-controlled variable resistance and said exciter generator field; a voltage source normally of magnitude equal to the voltage across said exciter generator field and arranged to decrease in magnitude at a predetermined timed rate upon detection of loss of adhesion between wheel and rail, means effective for sensing differences in voltages of said source and voltage across said exciter generator field upon detection of loss of adhesion between wheels and rail, means responsive to a sensed differential in the voltage across said exciter generator field and the voltage of said source for overriding governor control of said rheostat to increase the magnitude of the resistance in series with said exciter generator field and therefore decrease the current through said exciter generator field circuit to decrease the excitation of said generator at a rate determined by the rate of decrease in magnitude of the voltage of said voltage source.

3. In a locomotive unit, a governor-controlled prime mover, traction motors adapted to drive the locomotive wheels on rail, a generator driven by the prime mover adapted to control electrical power supplied to the traction motors, a generator field for controlling excitation of the generator, means for deriving a voltage of magnitude determining the power demand on the prime mover, means for detecting loss of adhesion between the locomotive wheels and rail, a series circuit comprising said voltage-deriving means, a governor-controlled variable resistance and said generator field; a capacitor connected across said field adapted to charge to the voltage across said field, a resistance connected across said capacitor to allow discharge of said capacitor at a predetermined rate, switching means responsive to loss of adhesion between wheels and rail for connecting a relay between said field and said capacitor, said relay becoming energized when the capacitor voltage decreases due to discharge through said resistance to a voltage magnitude sufficient to allow energizing current flow through said relay, energization of said relay being effective to override governor control of said variable resistance to cause increase in the magnitude of said variable resistance and hence decrease in voltage across and current through said field, said relay becoming de-energized when the voltage differential between said field and said capacitor is insufficient to continue energization of said relay, said relay being successively energized and de-energized to override governor control of said variable resistance to reduce excitation of said field until loss of adhesion is no longer detected, said switching means being effective to reconnect said capacitor across said field when loss of adhesion is no longer detected.

4. In a locomotive unit, a governor-controlled prime mover, traction motors adapted to drive the locomotive wheels on rail, a generator driven by the prime mover adapted to control electrical power supplied to the traction motors, a generator field for controlling excitation of the generator, means for deriving a voltage of magnitude determining the power demand on the prime mover, means for detecting loss of adhesion between the locomotive wheels and rail, a series circuit comprising said voltage-deriving means, a governor-controlled variable resistance and said generator field; a capacitor connected across said field adapted to charge to the voltage across said field, a first resistance connected across said capacitor to allow discharge of said capacitor therethrough at a predetermined rate, first switching means adapted to connect a second resistance in series with said field to reduce the current therethrough by a predetermined factor and a third resistance in parallel with said field upon detection of loss of adhesion between wheels and rail, said third resistance being so selected that the total resistance of said field and said second and third resistances is substantially equal to the resistance of said field, second switching means adapted to connect a relay between said capacitor and the higher potential side of said second resistance, said relay becoming energized when the voltage across said capacitor decreases due to discharge through said first resistance, energization of said relay being effective to actuate governor-overriding means to increase the resistance of said variable resistance to decrease the current through said field whereby upon detection of loss of adhesion the excitation of said field is first reduced by a predetermined factor and then reduced at a rate determined by the time constant of said capacitance and said first resistance.

References Cited in the file of this patent
UNITED STATES PATENTS

| | | |
|---|---|---|
| 2,703,845 | Stamm | Mar. 8, 1955 |
| 2,806,149 | Lillquist | Sept. 10, 1957 |